United States Patent Office 3,423,406
Patented Jan. 21, 1969

3,423,406
N-ALKENYL-3-ARALKYL-ALKYLENEIMINES
Robert Paul Mull, Florham Park, and Renat Herbert Mizzoni, Long Valley, R.D., N.J., assignors to Ciba Corporation, New York, N.Y., a corporation of Delaware
No Drawing. Continuation-in-part of application Ser. No. 480,147, Aug. 16, 1965, which in turn is a continuation-in-part of application Ser. No. 416,144, Dec. 4, 1964. This application May 8, 1967, Ser. No. 636,617
U.S. Cl. 260—240      10 Claims
Int. Cl. A61k 25/00; C07d 29/12

ABSTRACT OF THE DISCLOSURE

N-alkenyl-3-aralkyl-alkyleneimines of the formula

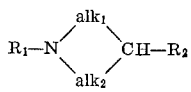

$R_1$=alkenyl, cycloalkyl-alkenyl or aralkenyl
$alk_1$=alkylidene
$alk_2$=alkylene with 2–6 ring-C
$R_2$=aralkyl quaternaries and salts thereof, e.g., the N-methallyl-3-benzhydrylpiperidine, inhibit gastric secretion.

Cross-references to related applications

This is a continuation-in-part of application Ser. No. 480,147, filed Aug. 16, 1965, now abandoned which in turn is a continuation-in-part of application Ser. No. 416,144 filed Dec. 4, 1964, now Patent No. 3,366,636.

Summary of the invention

The present invention concerns and has for its object the provision of new N-alkenyl-3-R-alkyleneimines, wherein R is an unsaturated hydrocarbon radical, more particularly those of the Formula I

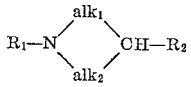

(I)

in which $R_1$ stands for an alkenyl group containing one to four double bonds, a part of which chain may form a cycloalkyl, cycloalkylidene, cycloalkenyl or cycloalkenylidene group, or aralkenyl group, $alk_1$ for lower alkylidene, $alk_2$ for lower alkylene with 2–6 ring-carbon atoms and $R_2$ for an aralkyl, cycloalkyl- or cycloalkenyl-aralkyl or a partially hydrogenated aryl radical, quaternaries and salts thereof, as well as of corresponding pharmaceutical compositions and methods for the preparation of the new compounds. Said compositions are useful in the management and treatment of gastric irritation or of gastric ulcers by reducing the amount of free acid in the stomach.

DESCRIPTION OF THE PREFERRED EMBODIMENTS

In Formula I, $R_1$ preferably stands for lower alkenyl, such as vinyl, allyl, propenyl, isopropenyl, 1-, 2- or 3-butenyl, butadienyl, 2-methyl-propenyl, 1-, 2-, 3- or 4-pentenyl, 2- or 3-methyl-1- or 2-butenyl, 1-, 2-, 3-, 4- or 5-hexenyl, 2,4-hexadienyl, 2,3-dimethyl-2-butenyl or -1, 3-butadienyl, 3- or 4-heptenyl or 2,3-dimethyl-2-pentenyl, but also for higher alkenyl, such as citronellyl, geranyl, farnesyl, oleyl or phytyl, as well as for cycloalkylidene- or cycloalkenylidene-lower alkyl, cycloalkyl-, cycloalkylidene-, cycloalkenyl- or cycloalkenylidene-lower alkenyl, such as cyclopropylidenemethyl, cyclopentylidenemethyl, cyclohexylidenemethyl, 2-cyclohexenylidenemethyl, 2-cyclopentyl-vinyl, 2 - cyclopent - 2-enyl-vinyl, 2-cyclohexyl-vinyl, 1- or 2-cyclopent-2-enyl-ethyl, 2-cyclopenta-2,4-dienyl-ethyl, 1- or 2-cyclohex-2-enyl-ethyl, 2-cyclopentylidene-ethyl, 3-cyclopentyl-2-propenyl, 3-cylopent-2-enyl-2-propenyl, 3 - cyclohexyl-2-propenyl, 3-cyclohex-2-enyl-2-propenyl, cyclopropyl-1-propenyl, 3-cyclopent-2-enylidene-propyl, 3-cyclohexylidene-propyl, 4-cyclopentyl-2-butenyl, 4 - cyclohexyl-1,3-butadienyl or 4-cyclopentyl-2-methyl-2-butenyl, but also for an aralkenyl group, such as styryl, cinnamyl, 4-phenyl-2- or 3-butenyl, 3-phenyl-2-butenyl, 2-methyl - 3 - phenyl-2-propenyl, 2,3-dimethyl-2-phenyl-2-propenyl, 5-phenyl-2-pentenyl or -2,4-pentadienyl or for said radicals substituted in the aromatic part by one or more than one of the same or of different substituents such as lower alkyl, e.g., methyl, ethyl, n- or i-propyl, free or etherified hydroxy or mercapto, e.g., methoxy, ethoxy or methylenedioxy, methyl- or ethylmercapto, halogen, e.g., fluoro, chloro or bromo, trifluoromethyl, nitro or amino, for example, lower alkyl- or di-lower alkylamino, e.g., methylamino, ethylamino, dimethylamino, diethylamino or methylethylamino. The aromatic part in said aralkenyl group preferably stands for phenyl, (lower alkyl)-phenyl, (lower alkoxy)-phenyl, (halogeno)-phenyl, (trifluoromethyl)-phenyl or (di-lower alkylamino)-phenyl.

The lower alkylidene group $alk_1$ preferably stands for methylidene (i.e., methylene), but also for ethylidene, 1- or 2-propylidene or 1-butylidene.

The lower alkylene group $alk_2$ preferably stands for 1,3-propylene, but also for 1,2-ethylene, 1,2-propylene, 1,2-, 1,3- or 1,4-butylene, 1,3-, 1,4-, 1,5- or 2,4-pentylene, 1,4- 1,5- or 1,6-hexylene or 3,5-heptylene.

The unsaturated hydrocarbon radical attached to the 3-position of the alkyleneimino ring is above all an aralkyl, cycloalkyl- or cycloalkenyl-aralkyl or a partially hydrogenated aryl radical. More especially it is a lower alkyl group containing one to three monocyclic, carbocyclic aryl radicals, such as benzyl, diphenylmethyl (benzhydryl), triphenylmethyl, phenethyl-(1) or -(2), 1,1- or 1,2-diphenylethyl, 1,1,1-triphenylethyl-(2), phenylpropyl-(1), -(2) or -(3), 1,1-, 2,2-, 3,3-, 1,2-, 1,3- or 2,3-diphenylpropyl-(3), 1,3-diphenylpropyl-(2), 1,2,3-triphenylpropyl-(2), phenylbutyl-(1), -(2), -(3) or -(4), 1,1-, 2,2-, 1,2-, 1,3-, or 2,3-diphenylbutyl-(3) or -(4) or tribenzylmethyl; or a lower alkyl group containing at least one cyclo-lower alkyl or alkenyl group, containing preferably 5 or 6 ring-carbon atoms, and at least one monocyclic carbocyclic aryl radical, but containing not more than 3 cyclic radicals, such as α-cyclopentyl-, α-cyclohexyl- or α-cyclohexen-(2)-yl-benzyl, α- or β-cyclohexylphenethyl-(2) or 1-cyclopentyl- or 1-cylopenten-(2)-yl-2,2-diphenylethyl-(2); or a partially hydrogenated bi- or tricyclic carbocyclic aryl radical, such as indenyl-(1), hydrindenyl-(2), tetralinyl-(1) or -(2), fluorenyl-(9), acenaphthenyl-(1), 9,10-dihydro-anthrazenyl-(9) or 1,2,3-trihydrophenalenyl-(2). These hydrocarbon radicals are unsubstiuted or substituted, especially in the aromatic part, by one or more than one of the same or of different substituents, such as those mentioned for the aralkenyl group $R_1$.

The quaternaries of the invention are preferably lower alkyl quaternaries.

The compounds of the invention exhibit valuable pharmacological properties. For example, they cause a marked decrease of the gastric secretion, especially of gastric hydrochloric acid, which can be demonstrated in animal tests, using mammals, such as dogs, as test objects. In the latter gastric secretion is induced either by food or by parenteral application of histamine. Besides their above mentioned utility the compounds of the invention are also useful as research tools in the study of the releasing mechanism of the gastric secretion, as well as valuable intermediates in the manufacture of other useful compounds, especially pharmacologically active compounds.

Particularly useful are compounds of the Formula II

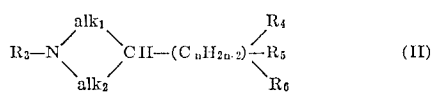

in which $R_3$ stands for alkenyl with up to 16 carbon atoms, cycloalkylidene- or cycloalkenylidene-alkyl, cycloalkyl- or cycloalkenyl-alkyl, cycloalkyl- or $R_7$-alkenyl in which the cycloaliphatic moieties contain 5 to 6 ring-carbon atoms and the alkyl or alkenyl moieties 2 to 8 carbon atoms, $R_7$ and one of the radicals $R_4$, $R_5$ and $R_6$ stands for phenyl, (lower alkyl)-phenyl, (lower alkoxy)-phenyl, (halogeno)-phenyl, (trifluoromethyl)-phenyl or (di-lower alkylamino)-phenyl, and the other two stand for hydrogen, cycloalkyl or cycloalkenyl with 5 to 6 ring-carbon atoms and/or phenyl, (lower alkyl)-phenyl, (lower alkoxy)-phenyl, (halogeno)-phenyl, (trifluoromethyl)-phenyl or (di-lower alkylamino)-phenyl, $alk_1$ stands for methylidene or ethylidene, $alk_2$ for 1,2-ethylene, 1,2- or 1,3-propylene, 1,3- or 1,4-butylene, 1,3-, 1,4- or 1,5-pentylene and $n$ for an integer from 1 to 4, and therapeutically useful acid addition salts thereof.

Compounds that are especially valuable are those of the Formula III

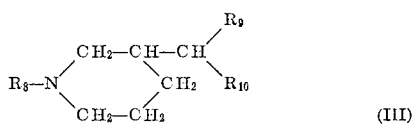

in which $R_8$ stands for alkenyl with up to 16 carbon atoms and up to 4 double bonds, cyclopentylidene-lower alkyl, cyclohexylidene-lower alkyl, cyclopentyl-lower alkenyl, cyclohexyl-lower alkenyl or $R_{11}$-lower alkenyl and each of the groups $R_9$, $R_{10}$ and $R_{11}$ stands for phenyl, (lower alkyl)-phenyl, (lower alkoxy)-phenyl, (halogeno)-phenyl, (trifluoromethyl)-phenyl or (di-lower alkylamino)-phenyl, and therapeutically useful acid addition salts thereof.

Above all, the present invention concerns compounds of the Formula III in which $R_8$ stands for allyl, 2-methylpropenyl, methallyl, 3-methyl-2-butenyl, geranyl, linaloyl, farnesyl, nerolidyl, cyclohexylidenemethyl or cinnamyl and each of $R_9$ and $R_{10}$ for phenyl, and therapeutically useful acid addition salts thereof which, when given at oral doses between about 1–15 mg./kg./day, preferably at 5–10 mg./kg./day to dogs whose gastric secretion is induced either by food or parenteral application of histamine, produce a selective inhibition of gastric secretion.

The compounds of the invention are prepared by methods in themselves known. For example, the procedure is (a) To react an N-unsubstituted alkyleneimine, containing in 3-position an unsaturated hydrocarbon radical, with a corresponding reactive esterified alkenol or (b) To react an N-unsubstituted alkyleneimine, containing in 3-position an unsaturated hydrocarbon radical, with a corresponding alkenal, alkanal, alkenone or alkanone under dehydrating conditions or (c) To split off water, acids, halogen or halo and alkoxy groups from N-(hydroxylated alkyl)-alkyleneimines, containing in 3-position an unsaturated hydrocarbon radical, their corresponding ethers and/or esters and, if desired, converting the final products into each other, converting a resulting compound into a lower alkyl-ammonium salt and/or converting a resulting base into a salt thereof or converting a resulting salt into the corresponding base or another salt.

A reactive esterified alkenol is, for example, such esterified with a strong inorganic acid, such as a hydrohalic, e.g., hydrochloric, hydrobromic or hydriodic acid, or sulfuric acid, or a strong organic acid, such as an alkane or benzene sulfonic acid, e.g. methane, ethane, benzene or p-toluene sulfonic acid.

The dehydrating conditions in the reaction shown under (b) preferably are those present during an azeotropic distillation, where the water formed in the reaction is eliminated together with part of a water-insoluble solvent, such as a hydrocarbon, e.g., benzene, toluene or xylene.

The elimination of water from the hydroxy-compounds shown under (c) may be performed, for example, with strong acids, such as sulfuric, phosphoric or sulfonic acids, and the elimination of acids from corresponding esters, e.g., hydrohalic, sulfonic or thiocarbonic acid esters, by pyrolysis or with bases, such as alkali metal hydroxides, alkoxides or carbonates, or tertiary nitrogen bases, e.g., pyridine. The elimination of halogen or halo and alkoxy groups may be performed, for example, with the use of metals, such as zinc or magnesium.

The products obtained may be converted into each other, for example, by isomerization, i.e., shifting a double bond into another position, for example, by the action of strong bases, e.g., alkali metal hydroxides. The quaternaries are obtained from the free compounds by reacting them preferably with reactively esterified lower alkanols.

The above-mentioned reactions are carried out according to standard methods, in the presence or absence of diluents, preferably such as are inert to the reagents and are solvents thereof, of catalysts, condensing agents and/or of inert atmospheres, at atmospheric or superatmospheric pressure, at low temperatures, room temperature or elevated temperatures. Condensing agents are preferably used in the reaction of compounds with a reactive esterified hydroxy group whereby an acid is split off. They are especially inorganic or organic bases, for example, alkali metal carbonates, such as potassium carbonate, or tertiary nitrogen bases, such as trimethylamine or pyridine.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with organic or inorganic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, citric, ascorbic, maleic, hydroxymaleic, pyroracemic, phenylacetic, benzoic, aminobenzoic, anthranilic, hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalene sulfonic and sulfanilic acid; methionine, tryptophan, lysine and arginine.

These or other salts of the new compounds, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts.

Mainly, those starting materials should be used in the reactions of the invention that lead to the formation of those compounds indicated above as being especially valuable.

The starting materials are known or, if they are new, may be prepared by methods in themselves known. Several of the new starting materials are described in U.S. Patent No. 3,252,983.

Starting materials or final products that are mixtures of isomers may be separated into single isomers by methods in themselves known. For example, compounds that contain one or more asymmetrical carbon atoms may be in the form of racemate mixtures, pure racemates or optical antipodes.

Mixtures of racemates, by virtue of the physicochemical differences between the components, can be resolved into the stereoisomeric pure racemates (diastereoisomers), for example, by chromatography and/or fractional crystallization. Racemic products can likewise be resolved into the optical antipodes, for example, by reaction with optically active acids, separation of the diastereomeric salts and liberation of the bases from the salts.

The compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g., corn starch or arrowroot, stearic acid or salts thereof, e.g., magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions, or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods, and contain about 0.1 to 75%, more particularly 1 to 50% of the active ingredient.

The following examples illustrate the invention and are not to be construed as being limitations thereon. Temperatures are given in centigrade, and all parts wherever given are parts by weight.

Example 1

A mixture of 25.1 g. of 3-benzhydryl-piperidine, 12.1 g. of allylbromide and 42 g. of sodium carbonate in 150 ml. of benzene and 3.5 g. of water is refluxed for twenty hours while stirring. The hot solution is filtered, the residue washed with hot benzene and the filtrate evaporated under reduced pressure. The residue is distilled in vacuo, the fraction boiling at 162–163°/0.3 mm. collected and recrystallized from aqueous ethanol; it represents the N-allyl-3-benzhydryl-piperidine of the formula:

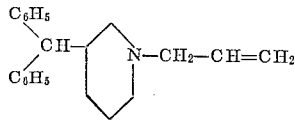

melting at 59–64°.

Example 2

The mixture of 10.0 g. 3-benzhydryl-piperidine, 4.0 g. 2-methyl-prionaldehyde and 40 ml. benzene is refluxed for 6 hours, during which time the water formed is removed by means of a water trap. The mixture is evaporated, the residue distilled and the fraction boiling at 146–150°/0.1 mm. collected; it represents the N-(2-methyl-propenyl)-3-benzhydryl-piperidine of the formula:

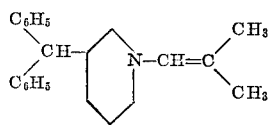

Example 3

The mixture of 10.0 g. 3-benzhydryl-piperidine, 3.6 g. 3-chloro-2-methyl-propene, 15.0 g. sodium carbonate, 3 drops water and 100 ml. benzene is refluxed for 20 hours while stirring. The mixture is hot filtered, the filtrate evaporated in vacuo, the residue distilled and the fraction boiling at 140–151°/0.2 mm. collected; it represents the N-methallyl-3-benzhydryl-piperidine of the formula:

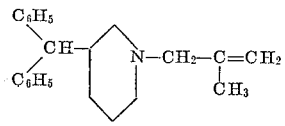

Example 4

The stirred mixture of 10.0 g. 3-benzhydryl-piperidine, 5.94 g. 1-bromo-3-methyl-2-butene, 15.0 g. sodium carbonate, 3 drops of water and 100 ml. benzene is refluxed for 21 hours. It is hot filtered, the filtrate evaporated under reduced pressure, the residue distilled and the fraction boiling at 173–175°/0.5 mm. collected; it represents the N-(3-methyl-2-butenyl)-3-benzhydryl-piperidine of the formula

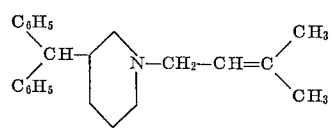

Example 5

The mixture of 10.0 g. 3-benzhydryl-piperidine, 6.2 g. hexahydro-benzaldehyde and 40 ml. benzene is refluxed for 6 hours, during which time the water formed is removed by means of a water trap. The reaction mixture is evaporated, the residue distilled and the fraction boiling at 174–180°/0.05 mm. collected; it represents the N-cyclohexylidenemethyl-3-benzhydryl-piperidine of the formula

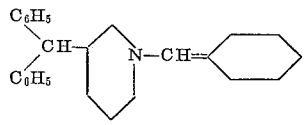

Example 6

The mixture of 6.3 g. 3-benzhydryl-piperidine, 6.0 g. farnesyl chloride, 2.65 g. sodium carbonate, 2 drops water and 100 ml. benzene is refluxed for 20 hours. The mixture is filtered, the filtrate concentrated in vacuo and the concentrate mixed with diethyl ether. The precipitate formed is filtered off (and discarded) the filtrate evaporated, the residue distilled and the fraction boiling at 220°/0.015 mm. collected; it represents the N-farnesyl-3-benzhydryl-piperidine of the formula

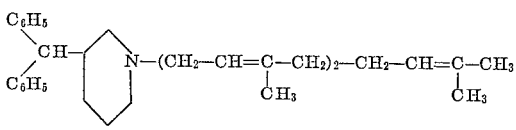

Example 7

The mixture of 7.5 g. 3-benzhydryl-piperidine, 4.5 g. cinnamyl chloride, 20.0 g. sodium carbonate, 2 drops water and 125 ml. n-butanol is refluxed for 3 days while stirring. It is filtered, the filtrate concentrated in vacuo, the residue distilled and the fraction boiling at 165–170°/0.01 mm. collected; it represents the N-cinnamyl-3-benzhydryl-piperidine of the formula

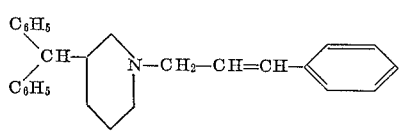

Example 8

The mixture of 5.0 g. geranyl chloride, 7.25 g. 3-benzhydryl-piperidine, 3.0 g. sodium carbonate and 125 ml. benzene is refluxed for 20 hours while stirring. It is filtered, the filtrate evaporated in vacuo, the residue distilled and the fraction boiling at 175–176°/0.01 mm. Hg collected; it represents the N-geranyl-3-benzhydryl-piperidine of the formula

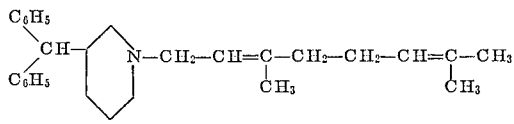

The starting material is prepared as follows: The solution of 21.2 g. thionyl chloride in 100 ml. benzene is added dropwise to the solution of 25.0 g. geraniol in 50 ml. benzene while stirring. Hereupon the mixture is refluxed for 12 hours and stirred overnight at room temperature. It is evaporated in vacuo, the residue distilled and the fraction boiling at 96–105°/25 mm. Hg collected; it represents the geranyl chloride.

Example 9

By replacing the geranyl chloride by the equivalent amount of linaloyl chloride (B.P. 93–94°/15 mm. Hg) or nerolidyl chloride (B.P. 93–99°/0.05 mm. Hg) the N-linaloyl-3-benzhydryl-piperidine of the formula

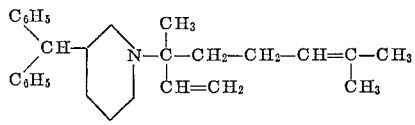

B.P. 198–199°/0.18 mm. Hg and the N-nerolidyl-3-benzhydryl-piperidine of the formula

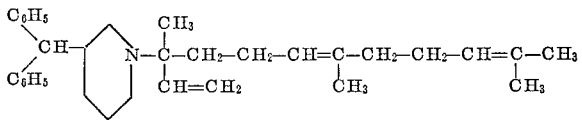

B.P. 200–210°/0.05 mm. Hg, are obtained.

Example 10

The mixture of 5.02 g. d-3-benzhydryl-piperidine, 4.8 g. farnesyl chloride (B.P. 90–108°/0.025 mm. Hg), 5.0 g. sodium carbonate and 100 ml. benzene is refluxed for 48 hours. It is filtered, the filtrate evaporated, the residue distilled and the fraction boiling at 210–224°/0.04 mm. Hg collected; it represented the d-N-farnesyl-3-benzhydril-piperidine, $[\alpha]_D^{25} = -11.5°$ (10.96 mg./ml. ethanol).

In the analogous manner the l-N-farnesyl-3-benzhydril-piperidine, $[\alpha]_D^{25} = +12.02°$ (17.22 mg./ml. ethanol), is prepared.

The starting material is advantageously prepared as follows: The mixture of 35.7 g. d,l-3-benzhydryl-piperidine, 26.8 g. benzyl bromide, 50.0 g. sodium carbonate, 400 ml. n-butanol and 4 drops of water is refluxed for 48 hours while stirring. It is filtered hot and the filtrate evaporated in vacuo. The residue is recrystallized from ethanol to yield the d,l-N-benzyl-3-benzhydryl-piperidine melting at 94–96°.

40.0 g. thereof are dissolved in 400 ml. hot acetone and to the solution 8.8 g, d-tartaric acid in 400 ml. hot acetone are added. The mixture is boiled for a few minutes whereupon precipitation occurs. It is allowed to stand at room temperature overnight and is then filtered to which melts, after recrystallization from acetone, at 137– yield 24.3 g. d-N-benzyl-3-benzhydryl-piperidine d-tartrate 139°; $[\alpha]_D^{25} = +17.18°$ (in water). [The mother liquor (A) contains the corresponding enantiomer and is worked up as described below.]

24.3 g. thereof are dissolved in the minimal amount of water, the solution is made basic with 40 percent aqueous sodium hydroxide and extracted 3 times with 75 ml. methylene chloride. The combined extracts are dried and evaporated in vacuo to yield the d-N-benzyl-3-benzhydryl-piperidine melting at 84–86°, after recrystallization from ethanol; $[\alpha]_D^{25} = -6.33°$ (in ethanol, c. = 17.5).

10.0 g. thereof are hydrogenated in 225 ml. anhydrous ethanol over 5.0 g. 10 percent palladium-charcoal at 40–50° and 45 p.s.i. for 8 hours. The mixture is allowed to cool overnight, it is filtered, the filtrate evaporated in vacuo, the residue distilled and the fraction boiling at 135–140°/0.02 mm. Hg collected; it represents the d-3-benzhydryl-piperidine, M.P. 69–72°, $[\alpha]_D^{25} = +9.01°$ (in ethanol, c. = 11). The hydrochloride thereof melts at 218–219° after recrystallization from acetonitrile.

The mother liquor (A) is concentrated in vacuo, the concentrate made basic with 40 percent aqueous sodium hydroxide and the mixture extracted 3 times with 75 ml. methylene chloride. The combined extracts are dried and evaporated in vacuo to yield the crude l-N-benzyl-3-benzhydryl-piperidine.

20.0 g. thereof are dissolved in 250 ml. hot acetone and to the solution 4.4 g. l-tartaric acid in 250 ml. hot acetone are added. The mixture is boiled for a few minutes, whereupon a precipitate is formed. It is allowed to stand overnight at room temperature, whereupon it is filtered to yield the l-N-benzyl-3-benzhydryl-piperidine l-tartrate melting at 137–139°, after recrystallization from acetone; $[\alpha]_D^{25} = -7.79°$ (in ethanol, c. = 10).

13.9 g. thereof are dissolved in the minimal amount of water, the solution made basic with 40 percent aqueous sodium hydroxide, extracted 3 times with 75 ml. methylene chloride, the extract dried and evaporated in vacuo to yield the l-N-benzyl-3-benzhydryl-piperidine, melting at 84–86°, after recrystallization from ethanol;

$$[\alpha]_D^{25} = +7.80°$$

(in ethanol, c. = 21.5).

8.0 g. thereof are hydrogenated in 200 ml. anhydrous ethanol over 4.0 g. 10 percent palladium-charcoal at 40–50° and 45 p.s.i. for 8 hours. After cooling overnight it is filtered, the filtrate evaporated in vacuo, the residue distilled and the fraction boiling at 135–140°/0.02 mm. Hg collected, to yield the l-3-benzhydril-piperidine melting at 67–70°; $[\alpha]_D^{25} = -6.71°$ (in ethanol, c. = 11.5). Its hydrochloride melts at 218–219° after recrystallization from acetonitrile.

Example 11

Preparation of 1000 tablets each containing 50 mg. of the active ingredient.

Formula:                                         Grams
N-farnesyl-3-benzhydryl-piperidine _____ 50.0
Colloidal silica _____ 2.5
Corn starch _____ 7.5
Magnesium stearate _____ 1.0
Lactose _____ 89.0
Ethanol (anhydrous), q.s.
Purified water, q.s.

Procedure.—The lactose and the drug substance are passed through a comminuting machine using a screen with 1.2 mm. openings. The stearate, starch and silica, previously mixed with a small portion of the lactose, are added to the sieved powders, which are mixed at low speed for 30 minutes. They are then granulated with ethanol-water (1:1) until suitable granules are formed. The granulate is passed through a comminuting machine (knives forward) using a screen with 4.0 mm. openings. The granulate is dried at 49° to a moisture content below 2 percent, again passed through a comminuting machine (knives forward) using a screen with 1.4 mm. openings and compressed into 150 mg. tablets using standard concave punches with 7.1 mm. diameter.

We claim:
1. N-cyclohexylidenemethyl-3-benzhydryl-piperidine.
2. A compound having the formula

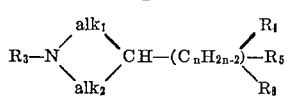

in which $R_3$ is a member selected from the group consisting of alkenyl with up to 16 carbon atoms and up to 4 double bonds, cyclopentylidene-alkyl, cyclohexylidene-alkyl, cyclopentyl-alkenyl, cyclohexyl-alkenyl and $R_7$-alkenyl in which the alkyl and alkenyl moieties contain 2 to 8 carbon atoms, $R_7$ and one of the radicals $R_4$, $R_5$ and $R_6$ is a member selected from the group consisting of phenyl, (lower alkyl)-phenyl, (lower alkoxy)-phenyl, (halogeno)-phenyl, (trifluoromethyl)-phenyl and (di-lower alkyl-amino)-phenyl, and the other two stand for a member selected from the group consisting of hydrogen, cycloalkyl and cycloalkenyl with 5 to 6 ring-carbon atoms, phenyl, (lower alkyl)-phenyl, (lower alkoxy)-phenyl, (halogeno)-phenyl, (trifluoromethyl)-phenyl and (di-lower alkyl-amino)-phenyl, $alk_1$ is a member selected from the group consisting of methylidene and ethylidene, $alk_2$ is a member selected from the group consisting of 1,3-propylene, 1,3-butylene, and 1,3-pentylene, and $n$ for an integer from 1 to 4 and therapeutically acceptable acid addition salts thereof.

3. N-cinnamyl-3-benzhydryl-piperidine.
4. N-geranyl-3-benzhydryl-piperidine.
5. N-linaloyl-3-benzhydryl-piperidine.
6. N-nerodilyl-3-benzhydryl-piperidine.
7. d-N-farnesyl-3-benzhydryl-piperidine.
8. l-N-farnesyl-3-benzhydryl-piperidine.
9. A compound having the formula

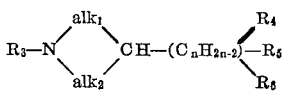

in which $R_3$ is a member selected from the group consisting of alkenyl with 8 to 16 carbon atoms and up to 4 double bonds, cyclopentylidene-alkyl, cyclohexylidene-alkyl, cyclopentyl-alkenyl, cyclohexyl-alkenyl and $R_7$-alkenyl in which the alkyl and alkeny moieties contain 2 to 8 carbon atoms, $R_7$ and one of the radicals $R_4$, $R_5$ and $R_6$ is a member selected from the group consisting of phenyl, (lower alkyl)-phenyl, (lower alkoxy)-phenyl, (halogeno)-phenyl, (trifluoromethyl)-phenyl and (di-lower alkyl-amino)-phenyl, and the other two stand for a member selected from the group consisting of hydrogen, cycloalkyl and cycloalkenyl with 5 to 6 ring-carbon atoms, phenyl, (lower alkyl)-phenyl, (lower alkoxy)-phenyl, (halogeno)-phenyl, (trifluoromethyl)-phenyl and (di-lower alkyl-amino)-phenyl, $alk_1$ is a member selected from the group consisting of methylidene and ethylidene, $alk_2$ is a member selected from the group consisting of 1,3-propylene, 1,3-butylene, and 1,3-pentylene, and $n$ is an integer from 1 to 4 and therapeutically acceptable acid addition salts thereof.

10. A compound as claimed in claim 9 and having the formula

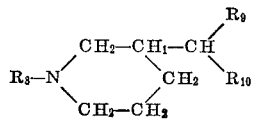

in which $R_8$ is a member selected from the group consisting of alkenyl with 8 to 16 carbon atoms and 4 double bonds, cyclopentylidene-lower alkyl, cyclohexylidene-lower alkyl, cyclopentyl-lower alkenyl, cyclohexyl-lower alkenyl and $R_{11}$-lower alkenyl and each of $R_9$, $R_{10}$ and $R_{11}$ is a member selected from the group consisting of phenyl, (lower alkyl)-phenyl, (lower alkoxy)-phenyl, (halogeno)-phenyl, trifluoromethyl)-phenyl and (di-lower alkyl-amino)-phenyl, and therapeutically acceptable acid addition salts thereof.

References Cited

UNITED STATES PATENTS

| | | | |
|---|---|---|---|
| 2,739,969 | 3/1956 | Sperber et al. | 260—293 |
| 2,957,879 | 10/1960 | Hoffmann et al. | 260—293 |
| 3,133,074 | 5/1964 | Freter et al. | 260—294.3 |
| 3,209,006 | 9/1965 | Wragg et al. | 260—293 |

OTHER REFERENCES

Sury et al., Helv. Chim. Acta, vol. 37, pp. 2133 to 2139 (1954).

JOHN D. RANDOLPH, *Primary Examiner.*

U.S. Cl. X.R.

260—293; 424—267